March 28, 1939.  E. J. BENZ  2,152,581

TRANSMISSION CONTROL MECHANISM

Filed Sept. 22, 1937  4 Sheets-Sheet 1

INVENTOR
*Erwin J. Benz.*
BY
*Dike, Calver & Gray*
ATTORNEYS.

March 28, 1939. E. J. BENZ 2,152,581
TRANSMISSION CONTROL MECHANISM
Filed Sept. 22, 1937 4 Sheets-Sheet 2

INVENTOR
Erwin J. Benz.
BY Dike, Calver & Gray
ATTORNEYS.

March 28, 1939. E. J. BENZ 2,152,581
TRANSMISSION CONTROL MECHANISM
Filed Sept. 22, 1937 4 Sheets-Sheet 3

INVENTOR
Erwin J. Benz.
BY Dike, Calver & Gray
ATTORNEYS.

March 28, 1939.         E. J. BENZ              2,152,581
               TRANSMISSION CONTROL MECHANISM
                  Filed Sept. 22, 1937     4 Sheets-Sheet 4

INVENTOR
Erwin J. Benz.
BY
Dike, Calver + Gray
ATTORNEYS

Patented Mar. 28, 1939

2,152,581

UNITED STATES PATENT OFFICE 2,152,581

TRANSMISSION CONTROL MECHANISM

Erwin J. Benz, Detroit, Mich., assignor to Hudson Motor Car Company, Detroit, Mich., a corporation of Michigan Application September 22, 1937, Serial No. 165,036

26 Claims. (Cl. 74—334)

This invention relates to transmissions, such as automotive transmissions, and more particularly, although not exclusively, to a transmission equipped with manually operable remote control means which, for example, may embody a vacuum operated gear shifting cylinder-and-piston means controlled by means of electric circuits including a switch with a miniature selector lever, usually arranged on the steering column, which can be selectively moved into various positions, similarly to a conventional gear shifting lever, thereby setting the electric control means to permit predetermined operation of the vacuum control means which shift the transmission gears into corresponding positions.

Considerable difficulties have been experienced in the use of such transmissions through butting of gear teeth when shifting into low or reverse gear. In a manual shift, the operator is capable of feeling at the gear shifting lever the resistance to the mesh when the gears abut, and he usually works the gear shifting lever forward and backward until the gears are slightly moved and brought into positions where continued pressure on the gear shifting lever slides the moving gear into full mesh. The movement of the gears into a proper meshing engagement is also felt at the gear shifting lever, since the lever is easily moved all the way into the accustomed position. Such a "feel" has not been possible at the selector switch lever of the electric hand, since there is no direct mechanical connection between the selector switch lever and the transmission gears, and after the lever is moved practically with no resistance all the way into a desired position, the gears may abut and even grind without producing any sensible "feel" at the lever.

One of the objects of the present invention is to provide an improved automotive transmission in which the above difficulties are largely eliminated and in which butting of the gears can be easily felt by the driver through the selector switch lever, and in which a proper meshing of the gears can be similarly felt.

Another object of the invention is to provide means for an automobile transmission equipped with a power shifter, whereby a sensible resistance is offered to the movement of the selector lever if the transmission gears abut, which resistance is quickly released when the gears are slid into a proper meshing engagement.

It is an added object of the present invention to provide an improved transmission having means of the foregoing character, which means are simple in construction and do not increase appreciably the manufacturing cost of the transmission.

Other objects and advantages of this invention will appear in the following description and appended claims, reference being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, an automobile transmission equipped with a power gear shifting device, means being provided for yieldingly resisting movements of the selector switch handle or lever until the transmission gears are properly meshed, whereupon said resistance is suddenly released and notice is given to the driver that proper meshing of gears has been effected. In accordance with the invention said means for example may comprise generally a magnetic clutch provided with means engaging the selector switch lever shaft and yieldingly resisting rotation thereof when the magnetic clutch is engaged, but offering no resistance when the clutch is disengaged.

Means controlling engagement and disengagement of the electric or magnetic clutch comprise, generally, an electric circuit controlled by a switch operated by a member moving with the sliding gear, said member being adapted to open the switch when the gear reaches the position of proper mesh, thereby breaking the circuit and disengaging the clutch. When the gears do not mesh, or have not yet reached the position of proper mesh, the switch remains closed and the clutch is engaged. In view of the fact that butting of gears may occur mainly when the gears are moved in starting the vehicle from a standstill either into first or into reverse gear, in the present embodiment of the invention the means of the foregoing character are provided only for cooperating with members effecting shifting of the gears into the first and reverse gears. However, by the provision of similar means cooperating with members effecting or moving with the transmission gears in shifting into second and third, similar operation of the remote selector or miniature switch lever in shifting gears into second or third may be effected.

Referring to the drawings, the structure illustrated therein comprises an automobile transmission 10 of a conventional design having a pair of longitudinally operable gear shift rails 11 and 12 provided with shifting forks 13 and 14. The shifting fork 13 of the rail 11 engages a sliding gear 15 slidably mounted on a shaft 16 and adapted to be moved by the fork 13 into a selective meshing engagement with either the low speed gear 17 or a reverse idler 18, thereby permitting operation of the vehicle in low or in reverse gear. Longitudinal movements of the shift rail 12 effect in a well known manner shifting of the transmission gears into second and into high gears. The shift rails 11 and 12 are moved longitudinally by means of a shifting finger 19 supported by a ball and socket joint 20. The lower end of the shifting finger 19 can swing from side to side to engage one or the other of the shift rails and can thereafter be moved forward or backward to move the shift rails to engage the various gears.

The shifting finger in the present embodiment, herein illustrated by way of example, is moved in the above described manner by pneumatically operated mechanisms controlled by means of a device known in the art under the name of "electric hand". Said pneumatically operated mechanisms act on a horizontal cross shaft 21 which projects into the transmission 10, the inner end of the shaft carrying an annular arm or bracket 22 which surrounds the lower end of the shifting finger 19. Thus, as the cross shaft 21 is slid in and out, the shifting finger 19 is moved from side to side, and, if the cross shaft 21 is rotated, the finger 19 is moved forward and backward. Hence, by proper movement of the shaft 21 all of the movements necessary to shift gears can be imparted to the gear shifting finger 19.

The movements of the desired character are imparted to the shaft 21 by a power cylinder or unit 23 and a diaphragm device 24, both of them being vacuum operated. The power unit 23 comprises a cylinder 25 with closed ends, in which cylinder there is slidably fitted a piston 26 mounted on a piston rod 27 passing through the closed front end 28 of the cylinder 25 and hingedly connected to a crank 29 secured to the outer end of the cross shaft 21 and provided with a cam extension 29a. Vacuum conduits 31 and 32 communicating with the vacuum zone in the intake manifold of the engine (not shown) and controlled by means of a solenoid valve device 33 cause the engine vacuum to act on the piston 26 at the desired side thereof. By virtue of such a construction the power unit 23 is double acting and therefore movements of the piston 26 in the cylinder 25 impart rotative movements to the cross shaft 21 in either direction, while through the annular arm 22 and the shifting finger 19 longitudinal movements are imparted to the respective shift rail.

Engagement of the corresponding shift rail by the shifting finger 19 is effected by means of a diaphragm mechanism 24 including a diaphragm 35 arranged in a casing 36 and acted upon by the vacuum transmitted into the casing through the conduit 37 and a spring 38 opposing the action of the vacuum. Movements of the diaphragm 35 are transmitted by a diaphragm rod 39 to the bell crank 40 pivotally secured to the transmission casing, as indicated at 41, and provided with a slotted extension 40a receiving the cam extension 29a of the crank 29.

From an examination of the drawings it can be clearly seen that when the vacuum is allowed to act through the conduit 37 on the diaphragm 35, the same moves toward the conduit in opposition to the action of the spring 38, rotating the bell crank 40 around the point 41 and moving the cross shaft 21 outward, which causes movement of the shifting finger 19 into engagement with the shift rail 11. If following such engagement of the shift rail 11, the vacuum is allowed to act through the conduit 31 on the upper side of the piston 26, the piston will move upward and the cross shaft 21 will rotate, pushing the shift rail 11 and, consequently, the sliding gear 15 rearward into an engagement with the reverse idler gear 18. If, however, the vacuum is acting through the conduit 32 on the lower side of the piston, the gear 15 will be moved forward into an engagement with the low speed gear 17. Similar action of the piston 26 with the shifting finger 19 in engagement with the shift rail 12, will cause shifting of the gears into the second and third, respectively.

The communication of the conduits 31, 32 and 37 with the vacuum zone of the engine, effected by means of a conduit 30, is controlled by means of three valves indicated by the numerals 42, 43 and 44 operated by means of solenoids 45, 46 and 47 respectively. The solenoids are, in turn, controlled by a system of electric circuits. The proper operation of the valves is accomplished by means of a selector mechanism having a shaft 51 operated by a miniature gear shift handle or lever 52 arranged in a casing 50 provided with an H-shaped slot in which points N, R, L, S and H correspond to neutral, reverse, low, second and high gear positions of the lever 52, respectively. The exact operation of the electric circuits fed from the battery 53, in response to the shifting of the lever 52 into various operative positions, is well known in the art and may be traced in the drawings, and, therefore, a detailed description thereof is omitted. For a complete understanding of the present invention it will suffice to state that the movements of the miniature lever 52 are duplicated by the shifting finger 19 whereby the desired shifting of the gears is effected as described.

The structure so far described constitutes prior art, and with the above description in view it can be easily understood that there is no mechanical connection between the lever 52 and the shifting finger 19, and, therefore, upon shifting the gear 15 it may happen that the teeth of the gear 15 may butt on the teeth of the low gear 17 or reverse idler gear 18 and no meshing occur. Nevertheless, the lever 52 will stay in the respective position as if the proper meshing was effected giving no notice to the driver of the dangerous condition in the transmission. If under such a condition the clutch engages and power is applied to the abutting gears, severe grinding of such gears may occur, resulting in noisy clashing, wearing out or even breaking of the gear teeth. In a manually operated transmission the driver immediately feels butting of the gears, since the shifting finger and consequently the shifting lever extending upward from the shifting finger, does not move all the way into the accustomed position, which gives notice to the operator to repeat the shifting operation.

In accordance with the present invention means are provided whereby the driver may feel at the miniature shift lever 52 an occurrence of a proper meshing of the gears. Said means are so arranged that even if no notice of the butting of gears is taken by the operator and he releases the lever 52 for operating the vehicle in the selected gear, the lever 52 will be automatically returned into its original position, causing the shifting finger 19 to separate the abutting gears.

In the present embodiment of the invention said means include what is herein termed for convenience an electromagnetic clutch or magnetic friction brake generally designated at 54 mounted on the free end of the shaft 51, said clutch or brake comprising a winding 55, a fixed magnet plate 56, and a longitudinally movable plate 57 adapted to engage frictionally the fixed plate 56 when attracted thereto by the magnetic action. The shaft 51 is freely rotatable and longitudinally movable with respect to the fixed plate 56. It can also be freely moved longitudinally through the movable plate 57, but it is resiliently connected to the plate 57 for rotation by means of two flat springs 58 having corresponding ends anchored in a block 59 secured to the plate 57, the opposite ends of the springs slidingly extending through a slot provided in a block 60 secured to the plate 57 opposite the block 59. The ends of the springs 58 are brought together in the blocks 59 and 60 but are separated in their middle portions because of the engagement with the milled portions 51a of the shaft 51. By virtue of such a construction the plate 57, if disengaged from the fixed plate 56, rotates with the shaft 51 without any resistance. However, if the plate 57 engages the plate 56 and its rotation is thereby prevented, the rotation of the shaft 51 will tend to spread the springs 58 apart, deflecting the same. The springs 58 resist resiliently or yieldingly their deflection and, therefore, also the rotation of the shaft 51 as well as the operative movements of the handle 52. Thus, when the driver moves the handle 52 with the magnetic clutch plates 56 and 57 engaged, he feels a certain yielding resistance. As soon as these clutch plates are disengaged, said resistance is immediately released, which is immediately felt by the driver. The milled portions 51a are so arranged that when the handle 52 is in its neutral position and the plate 57 is in its mid-position the springs 58 are in the position of their least deflection. Therefore, rotation of the shaft 51 in either direction relatively to clutch plate 57 because of the movement of the handle 52 either into the reverse or the low gear position is yieldably resisted by the springs and the springs will tend to return the handle 52 into its neutral position.

In accordance with the invention means are provided whereby the clutch 54 remains engaged until proper engagement of the sliding gear 15 with the respective transmission gear is effected, said means being adapted to disengage the clutch 54 as soon as such engagement occurs.

In the present embodiment of the invention said means are exemplified by an electric circuit including a source of electric energy, in the present instance the storage battery 53. One of the terminals of the battery 53 is grounded on the vehicle structure as shown at 61, while to the other terminal there is electrically connected a conductor 62, the opposite end whereof is electrically connected to the terminal 55a of the winding 55 of the electromagnetic clutch 54. Into the conductor 62 there are interposed an ignition key operated switch 63, a clutch pedal operated switch 64, a cut-out switch 65, and a selector shaft operated switch designated as a whole at 66. To the second terminal 55b of the winding 55 of the electromagnetic clutch 54 there is connected a conductor 67, the opposite end of which is electrically connected to the shift rail operated switch designated as a whole at 68, the latter being adapted to establish and to break the electric contact of the conductor 67 with the shift rail 11 which is grounded on the vehicle structure.

The function of the ignition key operated switch 63 is to render the control means inoperative when the ignition key is turned to its off position, thereby preventing discharge of the battery 53; the function of the cut-out switch 65 is to enable selective disconnection of the electric hand controlled means; and, finally, by the provision of the clutch pedal operated switch 64 the control means are disconnected from the source 53 when the vehicle clutch is engaged because of the releasing of the clutch pedal 69. Switches similar to switches 63, 64, 65 and 66 are found in the conventional "electric hand" control means and, therefore, they affect the operation of said means as well as of the means provided in accordance with the present invention. The shift rail operated switch 68 provided in accordance with the present invention is not found in conventional structures.

The purpose of the selector shaft operated switch 66 is to close the electromagnetic clutch operating circuit when the shaft 51 is moved with the aid of the handle 52 longitudinally to the left in order to permit moving of said handle into the reverse or low gear positions, and to open said circuit when said handle is moved to the right in order to permit movement thereof into the second and high gear positions. In the present embodiment the switch 66 comprises an insulated conductor sleeve 70 mounted on the shaft 51 and made flush with the cylindrical surfaces thereof. The contacts 71 and 72 are so arranged that both of them contact said sleeve 70 thereby closing the circuit when the shaft 51 is moved to the left (see Fig. 4), while one of said contacts, in the present instance the contact 72, contacts the insulation when the shaft 51 is moved to the right, thereby breaking the circuit.

The function of the shift rail operated switch 68 is to keep the circuit closed when the gear 15 is in its out-of-mesh position and to open the circuit when said gear is in its in-mesh position. In the present embodiment, said switch 68 comprises a hinged arm 73 having one end 73a adapted to contact a piece 74, while its opposite end 73b is adapted to contact the shift rail 11. The shift rail 11 is cut-out as indicated at 75 to form a valley with sloping sides 76 and 77, which are so arranged that when the gear 15 meshes with the low gear 17, the end 73b rides over the portion 77 and opens the switch (see Fig. 5). If the shift rail 11 is moved to effect meshing of the gear 15 with the reverse idler gear 18, the end 73b rides over the side 76 and also opens the switch. If, however, the shift rail 11 is brought into the position corresponding to the neutral or out-of-mesh position of the gear 15, the end 73b rests on the bottom of the valley and the switch is closed.

Figure 1:
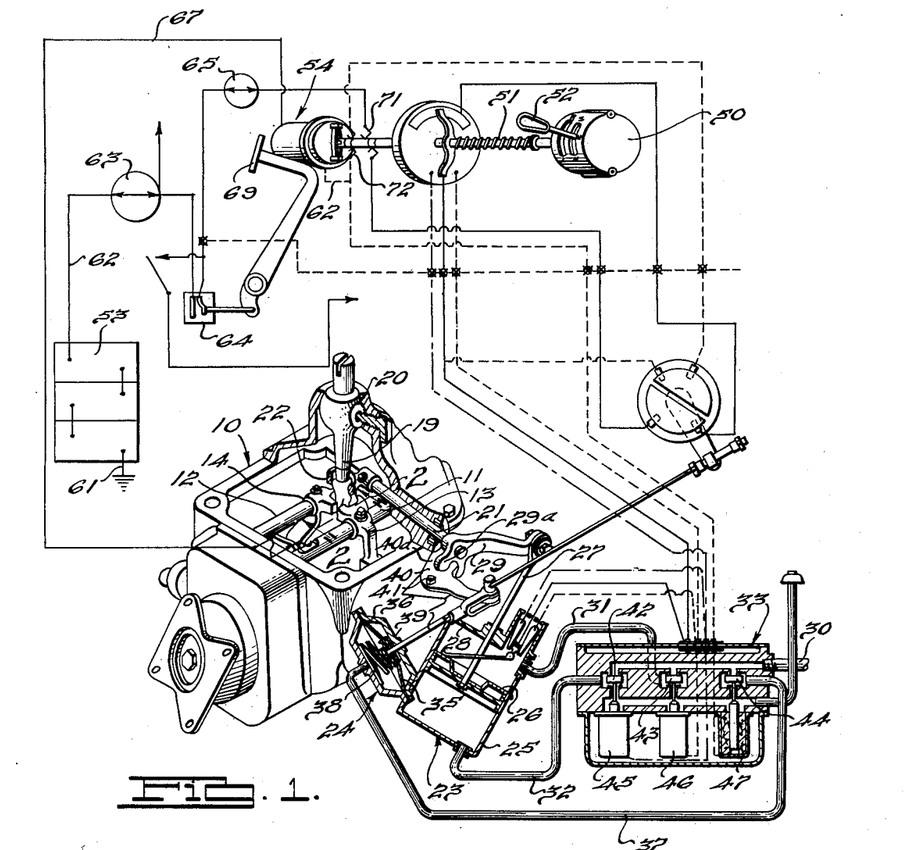
Fig. 1 is a perspective view, partly in section, of a transmission equipped with a power shifter embodying the present invention, the electric circuits being indicated diagrammatically.
Figure 2:
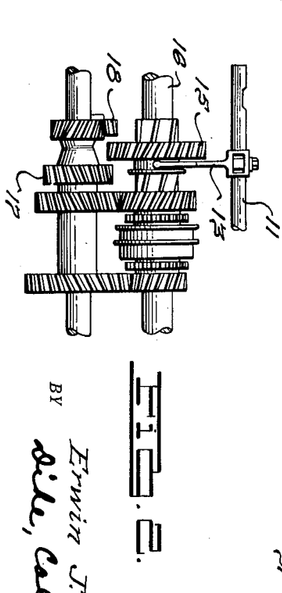
Fig. 2 is a view taken in the direction of the arrows on the vertical plane passing through the line 2—2 of Fig. 1.
Figure 3:
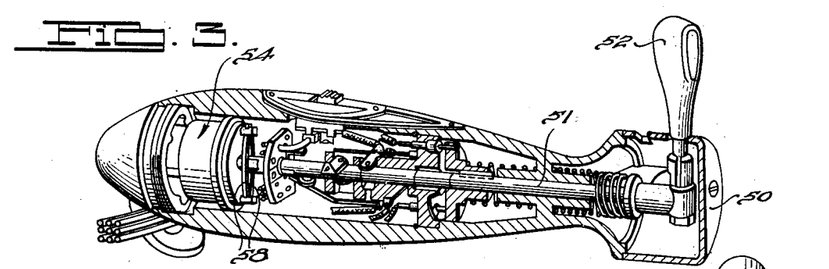
Fig. 3 is a perspective view, partly in section, of the selector switch showing the magnetic clutch cooperating therewith.
Figure 4:
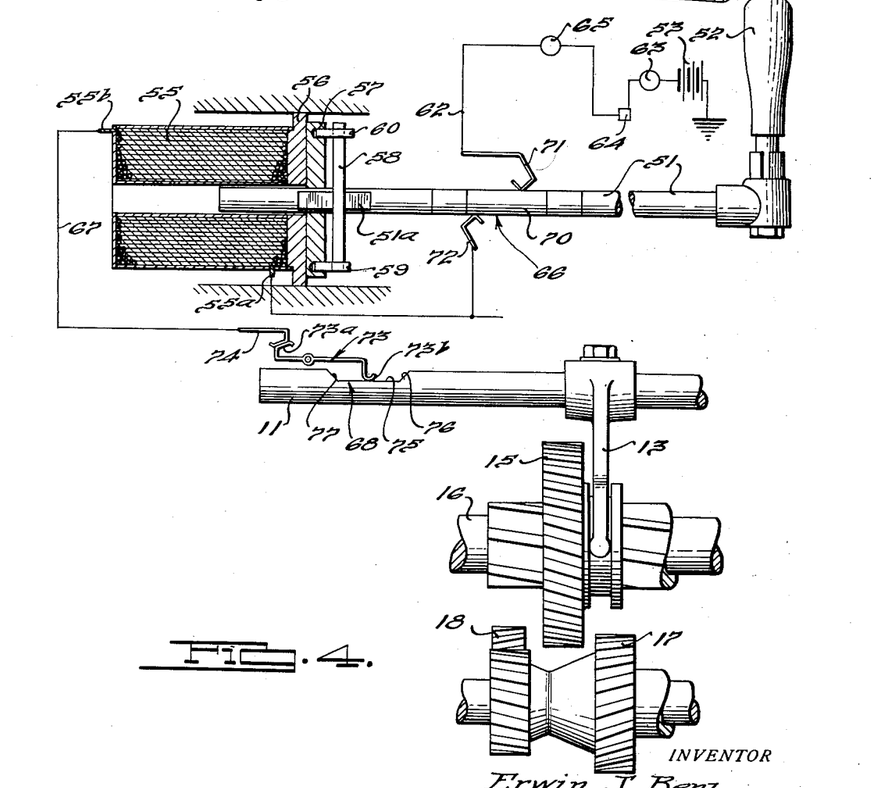
Fig. 4 is a diagrammatic view illustrating the electric circuit controlling the magnetic clutch, the clutch being shown engaged.
Figures 5, 6:
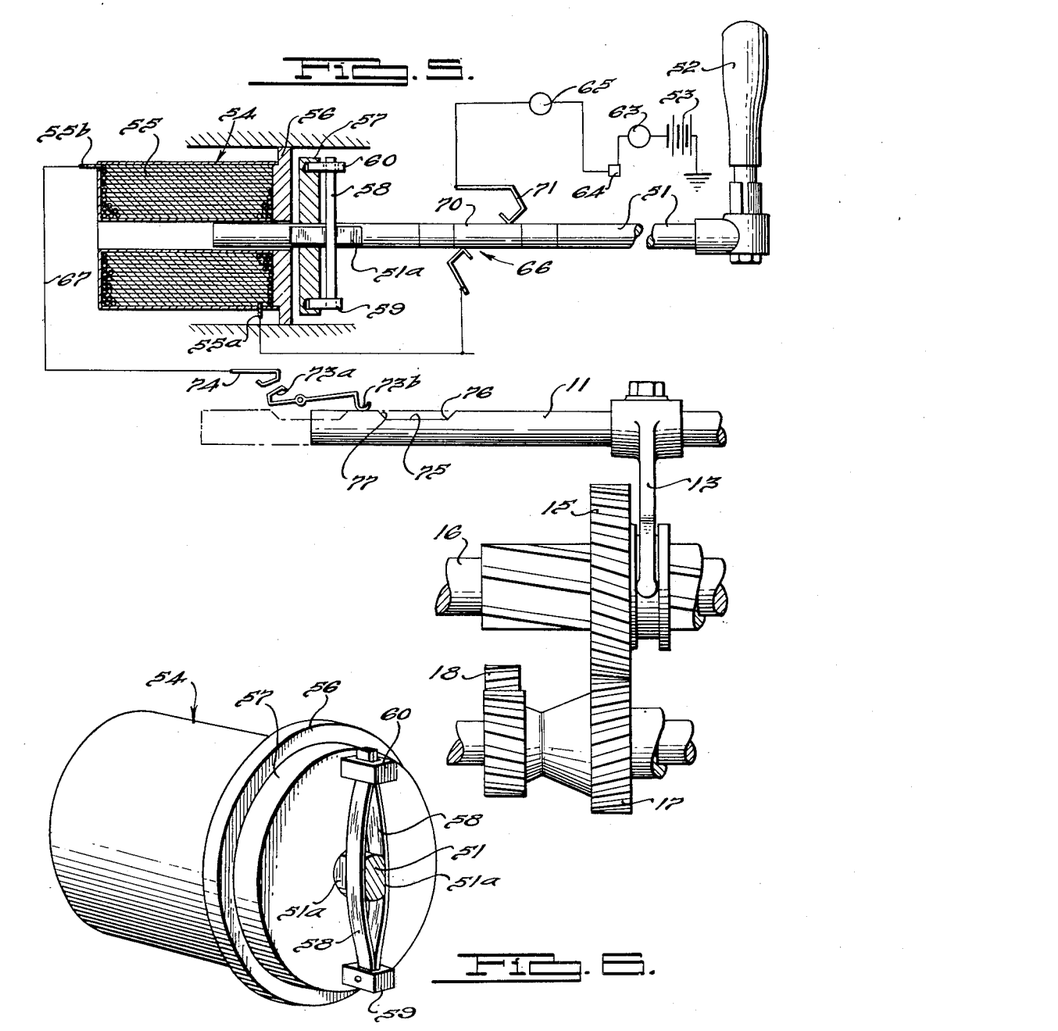
Fig. 5 is a view similar in part to Fig. 3, the clutch being shown disengaged.
Fig. 6 is an enlarged perspective view illustrating the operative connection of the selector lever shaft with the magnetic switch.

With the above description in view it can be easily understood from an examination of Figs. 1, 4 and 5 that as the handle 52 is moved from its neutral position toward the left, the selector shaft switch 66 will close the circuit and the electric current will flow from the battery 53 through the conductor 62 (switches 63, 64 and 65 being closed), contact 71, sleeve 70, contact 72 through the winding of the electro-magnetic clutch 54, through the conductor 67 and switch 68 to the ground effected by the rail 11 and back to the source 53. Under these conditions the electromagnet will be energized and the plate 57 drawn to the plate 56 frictionally engaging the same. Movements of the handle 52 into reverse or low gear positions will then be resisted by the action of the springs 58, and therefore the operator will feel a yielding resistance to the movement of said handle. Should teeth of the gear 15 butt with the teeth of the gear 17 or 18, the rail 11 will not move all the way to enable the end 73b to rise on the respective sloping side to effect opening of the switch, and therefore the switch 68 will remain closed. The driver will feel the continued resistance of the handle 52, and, if released, said handle will move down into the middle position, indicating that shifting of the gears should be attempted again. If, however, the teeth of the gears mesh, the rail 11 moves all the way and the switch 68 opens as described, breaking the circuit. When the circuit is broken the electromagnetic clutch 54 is denergized and the plate 57 is no more held tight against the plate 56, and said plate 57 rotates following the shaft 51 until the deflection of the springs 58 is destroyed. The disengagement of the plates 56 and 57 immediately releases the resistance to the movement of the handle 52, which is noticed by the operator, thereby indicating that proper meshing of the gears has been effected.

Figure 7:
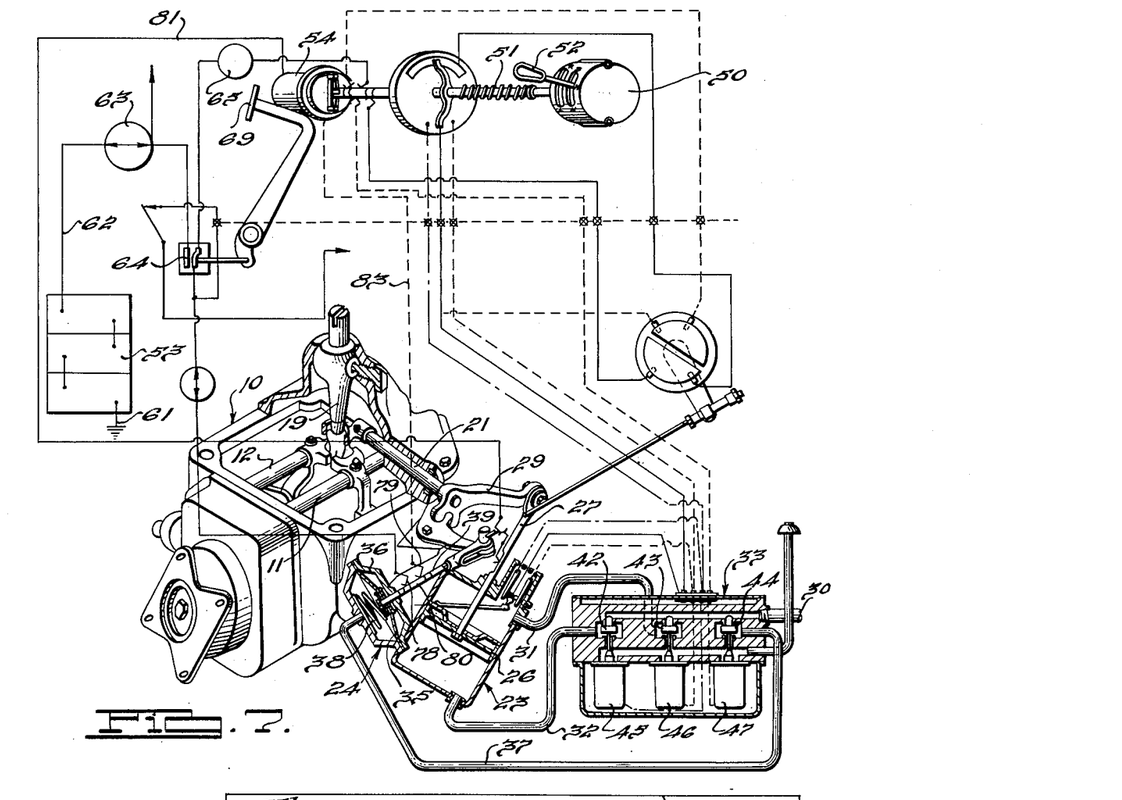
Fig. 7 is a perspective view, partly in section, with diagrammatically indicated electric circuits, illustrating a modified structure embodying the present invention.
Figure 8:
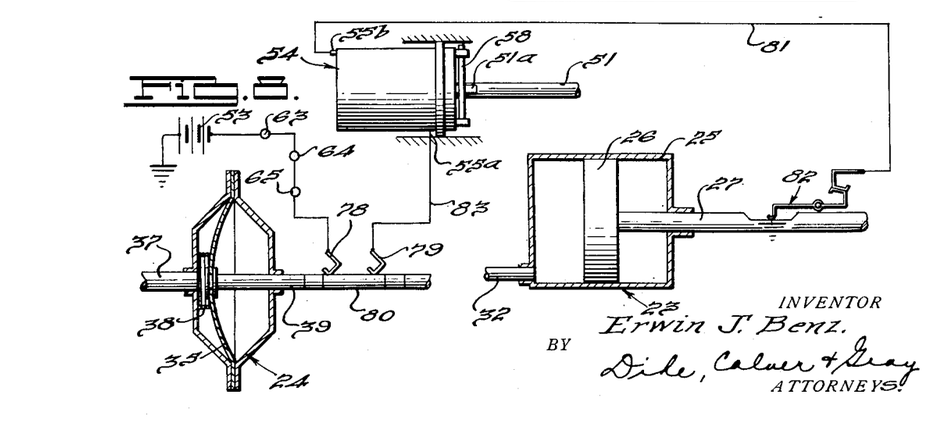
Fig. 8 is a diagrammatic view illustrating the electric circuit operatively connecting the magnetic clutch, the diaphragm and the vacuum piston switches, the clutch being shown engaged.

It will now be understood in view of the foregoing that the selector shaft operated switch 66 may be substituted by a switch operated by any member which moves in response to the longitudinal movement of the shaft 51 when said shaft is moved to permit rotation of the shaft to effect shifting of the gears into reverse or low gear. It can also be appreciated that the shift rail operated switch 68 may be substituted by a switch operated by any member which moves together or in response to the longitudinal movement of the shift rail 11. A large number of different locations of such switches may be effected in accordance with the present disclosure. Figs. 7 and 8 illustrate one of such modifications.

In the structure illustrated in Figs. 7 and 8, the selector shaft operated switch 66 is substituted by a switch provided on the rod 39 of the diaphragm mechanism 24, said switch being similar in construction to the switch 66 and comprising contact pieces 78 and 79 and an insulated contact sleeve 80 on the shaft or rod 39. The shift rail operated switch 68 is substituted by a switch 82 of similar construction but located at the piston rod 27 of the vacuum power unit 23. From an examination of Figs. 7 and 8 it can be easily appreciated that when the gear 15 is in an out-of-mesh position, the current flows from the source 53, through switches 63, 64, 65, contact pieces 78, 79, and sleeve 80. Conductor 83 to the winding of the electromagnetic clutch 54, through the conductor 81 to the switch 82 on the piston rod 27. Since movement of the shift rails is caused by the movement of the piston 26 and the rod 27, movement of said rod 27 operates similarly to the shifting rail 11 of the structure of Fig. 1, causing opening of the switch and breaking of the circuit when the meshing of the gears occurs. In other respects the operation of the structure illustrated in Figs. 7 and 8 is similar to the operation of the structure shown in Fig. 1.

In the present embodiment of the invention part of the electric circuit of the control means is utilized as a part of the circuit including means effecting sensible resistance to the movement of the selector switch lever, thereby utilizing the ignition key operated switch, the clutch pedal operated switch and the cut-out switch which are already provided in the circuit. It is to be understood that an entirely separate circuit fed from the same or from a separate source may be provided if desirable, and one or more switches acting as an ignition key operated switch, or as a clutch operated switch or cut-off switch may be inserted therein.

I claim:

1. In an automotive transmission having a gear slidable in the direction of its longitudinal axis into and out of meshing position, manually operable remote control means including a selector lever shaft, said gear adapted to be moved automatically in response to predetermined movements of said shaft; a member moving with said gear in the longitudinal sliding thereof, and means controlled by said member and adapted to resist yieldably the predetermined movements of said shaft when said gear is in its out-of-mesh position.

2. In an automotive transmission having a gear slidable in the direction of its longitudinal axis into and out of meshing position, manually operable remote control means including a selector lever shaft, said gear adapted to be moved automatically in response to predetermined movements of said shaft; a member moving with said gear in the longitudinal sliding thereof, means controlled by said member and adapted to resist yieldably the predetermined movements of said shaft when said gear is in its out-of-mesh position, and means rendering said resisting means inoperative when said gear reaches its meshed position.

3. In an automotive transmission having a gear slidable in the direction of its longitudinal axis into and out of meshing position, manually operable remote control means including a selector lever shaft, said gear adapted to be moved automatically in response to predetermined movements of said shaft; means adapted to resist yieldably the predetermined movement of said shaft when said gear is in its out-of-mesh position; a member moving with said gear in the longitudinal sliding movements thereof; electromagnetic means controlling said resisting means, and a switch controlled by said member to cause operation of said resisting means when said gear is in its out-of-mesh positions.

4. In an automotive transmission having a gear slidable in the direction of its longitudinal axis into and out of meshing position, manually operable remote control means including a selector lever shaft, said gear adapted to be moved automatically in response to predetermined movements of said shaft; means adapted to resist yieldably the predetermined movement of said shaft when said gear is in its out-of-mesh position; a member moving with said gear in the longitudinal sliding movements thereof; an electric circuit, electromagnetic means in said circuit controlling said resisting means, and a switch operated by said member for opening and closing the circuit to operate said electromagnetic means and to cause operation of said resisting means when said gear is in its out-of-mesh position and to render said resisting means inoperative when said gear reaches its in-mesh position.

5. In an automotive transmission having a gear slidable in the direction of its longitudinal axis into and out of meshing position, manually operable remote control means including a selector lever shaft, said gear adapted to be moved automatically in response to predetermined movements of said shaft; resilient means cooperating with said shaft to resist yieldably predetermined movement thereof; a member connected with said gear and moving therewith when said gear is moved longitudinally; an electric circuit, electromagnetic means in said circuit adapted to effect cooperation of said shaft by said resilient means when the circuit is closed, and a switch operated by said member, said switch adapted to be closed when said gear is in its out-of-mesh position.

6. In an automotive transmission having a gear slidable into and out of meshed position, said transmission being provided with manually operable remote control means including a selector lever shaft, said gear adapted to be moved automatically in response to a predetermined degree of rotation of said shaft; spring means adapted to engage said shaft and to resist yieldably predetermined rotation of said shaft; a member positively connected with said gear in the sliding movements thereof; an electric circuit, an electromagnetic clutch in said circuit adapted to effect operative engagement of said shaft by said spring means when the circuit is closed and to render such engagement inoperative when the circuit is open; and a switch operated by said member, said switch adapted to be closed when said gear is in its out-of-mesh position and to be open when said gear is in its meshed position.

7. In an automotive transmission having a gear slidable into and out of meshed position, said transmission being provided with manually operable remote control means including a shaft carrying a selector control lever, said gear adapted to be moved automatically in response to a predetermined degree of rotation of said shaft effected with the aid of said lever; spring means adapted to engage said shaft and to resist yieldably predetermined rotation of said shaft; a member adapted to move said gear into and out of its meshed position; an electric circuit, an electromagnetic clutch in said circuit mounted on said shaft and adapted to effect operative engagement of said shaft by said spring means when the circuit is closed and to render such engagement inoperative when the circuit is open; and a switch operated by said member, said switch adapted to be closed when said gear is in its out-of-mesh position and to be open when said gear is in its in-mesh position, whereby yieldable resistance is offered to the predetermined movements of said control lever when said gear is in its out-of-mesh position, said resistance being released when said gear is in its in-mesh position.

8. In an automotive transmission having a gear slidable into and out of its in-mesh position, said transmission being provided with manually operable remote control means including a selector lever shaft operable with the aid of a control lever provided thereon, said gear adapted to be moved automatically in response to predetermined rotative movements of said shaft; a plurality of springs engaging a portion of said shaft and adapted to be deflected when the shaft is rotated relative to said springs; a member engaging said gear and adapted to move the same into and out of its in-mesh position; an electric circuit, an electromagnetic clutch in said circuit adapted to provide anchorage means for said springs when the circuit is closed thus permitting relative rotation of springs and the shaft for deflecting said springs when the shaft is rotated, said clutch being further adapted to render said anchorage means movable with the shaft when the circuit is open; and a switch operated by said gear moving member and adapted to be closed when said gear is in its out-of-mesh position and to be open when said gear is in its in-mesh position, whereby yieldable resistance is offered to the predetermined movements of said control lever when said gear is in its out-of-mesh position, said resistance being released when said gear is in its in-mesh position.

9. In an automotive transmission having a gear slidable into and out of meshing engagement with two gears located at the respective ends of its path, said transmission being provided with remote control means including a selector lever shaft adapted to move longitudinally through a predetermined distance and to rotate through a predetermined angle, said gear adapted to be slid automatically in response to the rotative movements of said shaft; a member adapted to slide said gear into the various positions along its path; an electric circuit, electromagnetic means in said circuit adapted to offer a yieldable resistance to the rotation of said shaft when the circuit is closed, a switch operated by said member and adapted to be closed when said gear is in its out-of-mesh position and to be opened as said gear moves into its in-mesh position, and a switch responding to the longitudinal movement of said shaft and adapted to be closed when said shaft is moved longitudinally.

10. In an automotive transmission having a sliding gear movable into and out of meshing engagement with a low speed gear or with a reverse idler gear, a shift rail adapted to move said sliding gear, a shifting device adapted to engage said rail for moving the same, said transmission provided with remote control means including a selector shaft adapted to move longitudinally through a predetermined distance to effect engagement of said device with said rail and to rotate through a predetermined angle to effect selective engagement of said sliding gear with said reverse gear or said low gear; resilient means yieldably resisting operative rotation of said shaft when said sliding gear is in its out-of-mesh position, said means adapted to become inoperative to effect such resistance when meshing of said gears is effected and when said shifting device is out of engagement with said rail.

11. In an automotive transmission having a sliding gear movable into and out of meshing engagement with a low speed gear or with a reverse idler gear, a shift rail adapted to move said sliding gear, a shifting device adapted to engage said rail for moving the same, said transmission provided with remote control means including a selector shaft adapted to move longitudinally through a predetermined distance to effect engagement of said device with said rail and to rotate through predetermined angle to effect selective engagement of said sliding gear with said reverse gear or said low gear; means adapted to resist yieldingly the rotation of said shaft; and electromagnetic means operatively connected with said resisting means and adapted to render the same effective when said sliding gear is in its out-of-mesh position.

12. In an automotive transmission having a sliding gear movable into and out of meshing engagement with a low speed gear or with a reverse idler gear, a shift rail adapted to move said sliding gear, a shifting device adapted to engage said rail for moving the same, said transmission provided with remote control means including a selector shaft adapted to move longitudinally through a predetermined distance to effect engagement of said device with said rail and to rotate through a predetermined angle to effect selective engagement of said sliding gear with said reverse gear or said low gear; means adapted to resist yieldingly the rotation of said shaft; an electric circuit, and electromagnetic means in said circuit operatively connected with said resisting means to render the same effective when said sliding gear is in its out-of-mesh position, said electromagnetic means being further adapted to release the resistance offered by said means to the rotation of the shaft when meshing of the teeth of said sliding gear with the teeth of the reverse or low speed gear is effected.

13. In an automotive transmission having a sliding gear movable into and out of meshing engagement with a low speed gear or with a reverse idler gear, a shift rail adapted to move said sliding gear, a shifting device adapted to engage said rail for moving the same, said transmission provided with remote control means including a selector shaft adapted to move longitudinally through a predetermined distance to effect engagement of said device with said rail and to rotate through a predetermined angle to effect selective engagement of said sliding gear with said reverse gear or said low gear; means adapted to resist yieldingly the rotation of said shaft; an electric circuit, a switch adapted to close said circuit when the shifting device engages said shift rail, electromagnetic means in said circuit operatively connected with said resisting means for rendering the same effective when said sliding gear is in its out-of-mesh position, said electromagnetic means being further adapted to release the resistance offered by said means to the rotation of the shaft when meshing of the teeth of said sliding gear with the teeth of the reverse or low speed gear is effected.

14. In an automotive transmission having a sliding gear movable into and out of meshing engagement with a low speed gear or with a reverse idler gear, a shift rail adapted to move said sliding gear, a shifting device adapted to engage said rail for moving the same, said transmission provided with remote control means including a selector shaft adapted to move longitudinally through a predetermined distance to effect engagement of said device with said rail and to rotate through a predetermined angle to effect selective engagement of said sliding gear with said reverse gear or said low gear; spring means adapted to resist yieldingly the rotation of said shaft; an electric circuit, a switch adapted to close said circuit when the shifting device engages the shift rail; an electromagnetic clutch operatively connecting, when engaged, said spring means with the selector shaft for resisting rotation thereof, said clutch adapted to be engaged when the circuit is closed, and a second switch adapted to be closed when said sliding gear is in an out-of-mesh position and to open when the teeth of the sliding gear mesh with the teeth of the low speed gear or the reverse idler gear.

15. In combination with an automotive transmission including manually operable remote control means having a selector lever and a shaft controlled thereby, an electromagnetic clutch mounted on said shaft, and spring means secured to said clutch and engaging said shaft, said spring means adapted to be deflected when the shaft rotates in either direction from a predetermined original position during a time when the clutch is engaged, thereby tending to resist such rotation and cause reversion of the shaft to its normal position.

16. In combination with an automotive transmission including manually operable remote control means having a selector shaft, an electromagnetic clutch mounted on said shaft and having a fixed part and a movable part adapted to be moved into frictional engagement with said fixed part, said shaft being freely rotatable in said plates, a plurality of springs carried by said movable plate and engaging a portion of the shaft, whereby rotation of the shaft is resiliently resisted when said clutch parts are engaged.

17. In an automotive transmission having a sliding gear movable into and out of meshing engagement with a low speed gear or with a reverse idler gear, a shift rail adapted to move said sliding gear into meshing engagement therewith, a shifting device adapted to engage said rail for moving the same, said transmission provided with remote control means including a selector lever having a longitudinally movable and rotatable shaft, a diaphragm mechanism adapted to effect engagement of said shifting device and said shift rail in response to a predetermined longitudinal movement of said shaft, and a power cylinder with a piston adapted to move said shift rail in response to predetermined rotative movements of said shaft to effect meshing engagement of said sliding gear; spring means adapted to resist yieldingly the rotative movements of said shaft in either direction from a predetermined position; an electric circuit, a switch operated by said diaphragm mechanism and adapted to close the circuit when the shifting device engages the shift rail, electromagnetic means in said circuit adapted to effect resilient engagement of the shaft by the spring means when the circuit is closed, and a second switch operated by said power cylinder and adapted to be closed when said sliding gear is in an out-of-mesh position and to open when teeth of the sliding gear mesh either with the teeth of the low speed gear or the reverse idler gear.

18. In an automotive transmission having a sliding gear movable into and out of meshing engagement with a low speed gear or with a reverse idler gear, a shift rail adapted to move said sliding gear into meshing engagement therewith, a shifting device adapted to engage said rail for moving the same, said transmission provided with remote control means including a selector lever having a longitudinally movable and rotatable shaft, a diaphragm mechanism having a movable rod adapted to effect engagement of said shifting device and said shift rail in response to a predetermined longitudinal movement of said shaft, and a power cylinder with a piston mounted on a piston rod adapted to move said shift rail in response to predetermined rotative movements of said shaft to effect meshing engagement of said sliding gear; spring means adapted to resist yieldingly the rotative movements of said shaft in either direction from a predetermined position; an electric circuit, a switch operated by said diaphragm rod and adapted, when moved to effect engagement of said shifting device with said rail, to close the circuit, electromagnetic means in said circuit adapted to effect resilient engagement of the shaft by said spring means when the circuit is closed, and a second switch operated by the power cylinder piston rod and adapted to be opened when the teeth of the sliding gear mesh with the teeth of the selected gear.

19. In a gear transmission having a gear movable longitudinally of its axis into and out of a meshing engagement with other gears of the transmission and a manually operated remote control selector device, said gear adapted to be automatically moved in response to operative movements of said device; a member moving with said gear in the longitudinal movements thereof, and resilient means adapted to resist yieldably the operative movements of said device when said gear is in its out-of-mesh position, said resilient means being operative only when the vehicle is operating and the clutch pedal is pressed down to effect disengagement of the vehicle clutch.

20. In automotive transmission having a sliding gear movable into and out of meshing engagement with a low speed gear and with a reverse idler gear, a shift rail adapted to move said sliding gear, a shifting device adapted to engage said rail for moving the same, said transmission provided with manually operative remote control means including a selector device, means to effect engagement of said device with said rail upon movement of the selector device through a predetermined distance, means to effect selective engagement of said sliding gear with said reverse gear or said low gear upon rotation of said selector device through a predetermined angle; means adapted to resist yieldingly the rotation of said shaft; and electromagnetic means operatively connected with said resisting means for rendering the same effective as long as said sliding gear is out of mesh.

21. In a gear transmission having a sliding gear movable into and out of meshing engagement with other gears of the transmission, a remote control manually operable selector element, means whereby said gear is adapted to be automatically shifted in response to movement of said selector element, a resistance device for said selector element, and means controlled by the movement of said gear to render said device effective to resist movement of the selector element when said gear is in its out-of-mesh position.

22. In a gear transmission having a sliding gear movable into and out of meshing engagement with other gears of the transmission, a remote control manually operable selector element, means whereby said gear is adapted to be automatically shifted in response to movement of said selector element, a yieldable resistance device for said selector element, and means controlled by the movement of said gear to render said device effective to resist movement of the selector element when said gear is in its out-of-mesh position.

23. In a gear transmission having a sliding gear movable into and out of meshing engagement with other gears of the transmission, a remote control manually operable selector element, means whereby said gear is adapted to be automatically shifted in response to movement of said selector element, a resistance device for said selector element, and means controlled by the movement of said gear to render said device effective to resist movement of the selector element when said gear is in its out-of-mesh position, said device being ineffective to resist movement of the selector element when the gear is in its meshed position.

24. In a gear transmission having a sliding gear movable into and out of meshing engagement with other gears of the transmission, a remote control manually operable selector element, means whereby said gear is adapted to be automatically shifted in response to movement of said selector element, an electromagnetically controlled resistance device for said selector element, and means controlled by the movement of said gear to render said device effective to resist movement of the selector element when said gear is in its out-of-mesh position.

25. In a gear transmission having a sliding gear movable into and out of meshing engagement with other gears of the transmission, a remote control manually operable selector element, means whereby said gear is adapted to be automatically shifted in response to movement of said selector element, a resistance device for said selector element, a member movable with said gear, and means controlled by said member during the movement thereof to render said device effective to resist movement of the selector element when said gear is out-of-meshed position.

26. In a gear transmission having a sliding gear movable into and out of meshing engagement with other gears of the transmission, a remote control manually operable selector element, means whereby said gear is adapted to be automatically shifted in response to movement of said selector element, a resistance device for said selector element, and electromagnetic means controlled by the movement of said gear to render said device effective to resist movement of the selector element when said gear is in its out-of-mesh position.

ERWIN J. BENZ.